United States Patent [19]

Barthelemy

[11] 3,810,029

[45] May 7, 1974

[54] SYSTEM FOR DETECTING WEAK INFORMATION SIGNALS IN NOISY RECEIVER SIGNALS

[75] Inventor: Robert Lucien Barthelemy, Toulon, France

[73] Assignee: Etat Francais, Paris, France

[22] Filed: May 18, 1973

[21] Appl. No.: 361,558

[30] Foreign Application Priority Data

May 18, 1972 France .............................. 72.17849

[52] U.S. Cl................... 328/167, 328/151, 307/247, 329/106

[51] Int. Cl. ............................................. H04b 1/10

[58] Field of Search ............ 328/151, 167; 307/247; 329/106

[56] References Cited

UNITED STATES PATENTS

| | | | |
|---|---|---|---|
| 3,495,244 | 2/1970 | Rosa | 328/167 X |
| 3,714,588 | 1/1973 | Deboo et al. | 328/167 |
| 3,753,159 | 8/1973 | Burwen | 328/167 |

*Primary Examiner*—John S. Heyman

*Attorney, Agent, or Firm*—Larson, Taylor & Hinds

[57] ABSTRACT

A system is provided which permits the detection of a useful signal in a received signal having a low signal to noise ratio. The system includes a band pass filter connected to receive the signal to be processed, an AGC amplifier, and a comparator which compares the output of the amplifier with a threshold or reference level and produces an output during the time this level is exceeded. The output of the comparator is converted into a train of rectangular pulses which are sampled at a clock frequency which is substantially shorter than the minimum duration of the useful signal. A circulating memory receives the samples which are arithmetically summed at each clock time, the arithmetical sum being then compared with a second threshold level to determine whether the received signal is a useful signal.

15 Claims, 29 Drawing Figures

SYSTEM FOR DETECTING WEAK INFORMATION SIGNALS IN NOISY RECEIVER SIGNALS

FIELD OF THE INVENTION

The present invention is related to detection systems for detecting a useful signal in a received signal having a low signal to noise ratio.

BACKGROUND OF THE INVENTION

The present invention is, as stated, concerned with the detection of a weak signal in a noisy received signal, the noise portion of the signal having the characteristics of a random function and the invention relying on statistically determining the number of times a predetermined threshold is exceeded by the noise signal. Such a random function is that produced by the noise of submarine propellors as detected by a radar sonobuoy or the echo of an acoustical frequency pulse returned by the hull of a ship in response to an exploratory transmission by an active sounding device. At a short distance, such noise or such an echo is readily identified but at the range limit the received signal must be specifically processed to detect a useful portion of a received signal which is drowned by the noisy portion of the signal, the intensity of the noise, in many instances, exceeding that of the useful signal. Moreover, in certain very important applications, it is imperative that the range of the detection system be a maximum so as to enable detection of signals produced by objects at relatively great distances from the detecting system itself.

At the present time, so-called "active" sounding devices employ "adaptive filter" techniques which provide substantial improvement in the range of detection. However, this technique is not directly adaptable to conventional receivers and can be used only where basic and hence expensive modifications are made in the receiver design.

SUMMARY OF THE INVENTION

In accordance with the present invention a signal processing system is provided which provides substantial improvement in the operation of a standard receiver without modification of the basic receiver itself, the system of the invention being substituted by the standard analog detection and integration portion of the receiver. Among other advantages, the system of the invention permits the detection of a weak useful signal among brief parasitic signals even where the latter are intense.

In brief, the invention is based in part on the appreciation that the received signal, no matter what its origin, takes on a pseudo-periodic form after passing through a relatively narrow band filter. The output of the filter, after simple rectification, is compared with a threshold and a pulse produces during each portion of the signal which exceeds the threshold. The pulses so produced are totalized in a circulating memory and associated summing device during a period of previously elapsed periods N, where N is a predetermined, fixed number. If the output produced is greater than a predetermined reference, a decision circuit indicates that the input is a useful signal. The system serves to suppress brief, intense parasitic signals as stated hereinabove since such signals, after processing, will not exceed the reference level which determines whether the signal in question is, in fact, a useful signal.

A number of specific embodiments of the invention are described hereinafter and other features and advantages of the invention will be set forth in connection with, or apparent from, the description of these embodiments found below.

DESCRIPTION OF THE PREFERRED EMBODIMENTS

Figure 1:
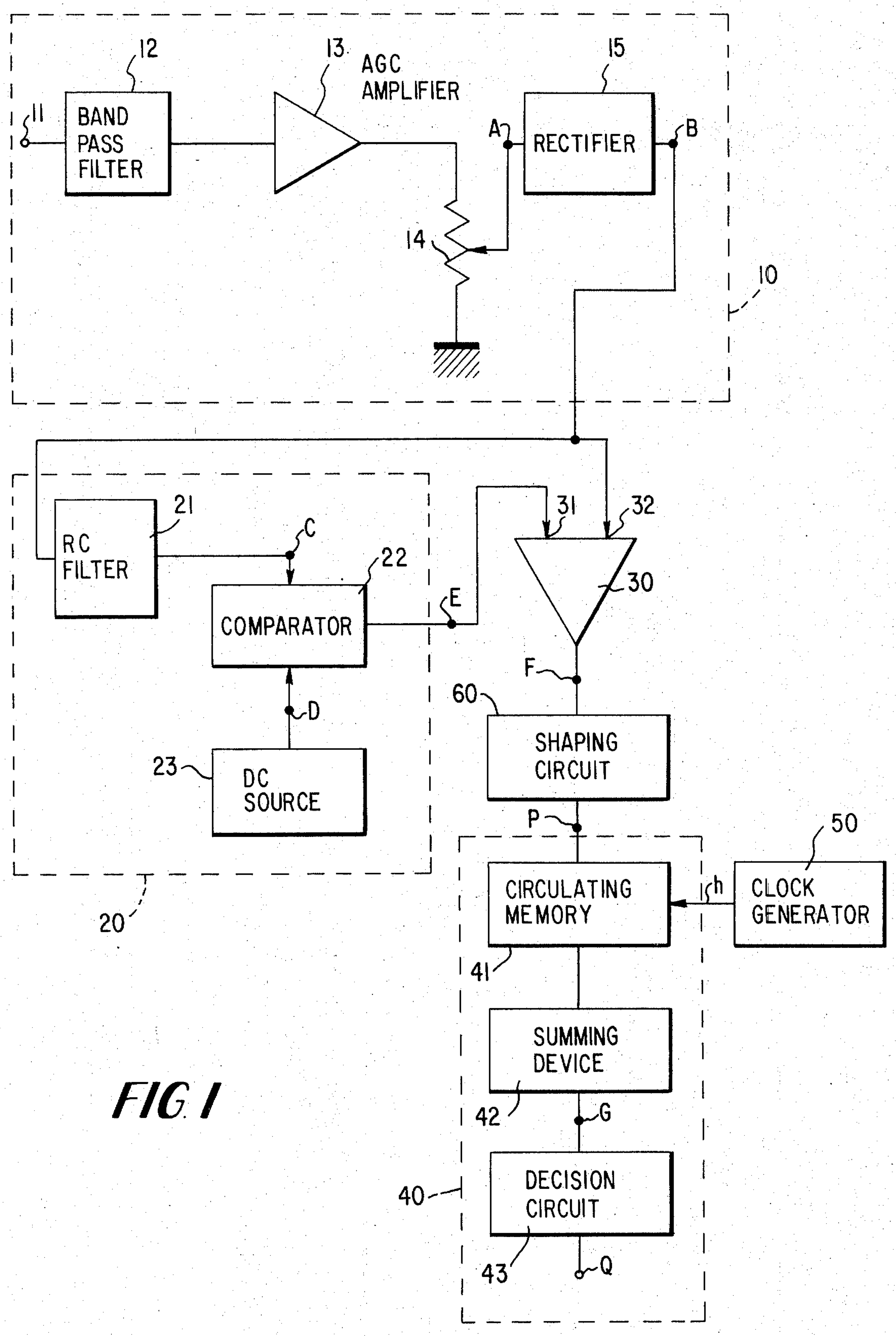
FIG. 1 is a schematic block diagram of a first embodiment of the signal processing system of the invention.

Referring to FIG. 1, a first embodiment of the invention is shown which basically comprises an input circuit, denoted 10, a threshold circuit 20 which produces a threshold voltage at the output thereof, a comparator 30 including a first input terminal 31 connected to the output of threshold circuit 20 and a second terminal 32 connected to the output (point B) of input circuit 10, a shaping circuit 60 connected to the output F of comparator 30, and a signal processing circuit 40 connected to the output of circuit 60 and controlled by a clock 50.

Figures 2A, 2B, 2C, 2D, 2E, 2F, 2G:
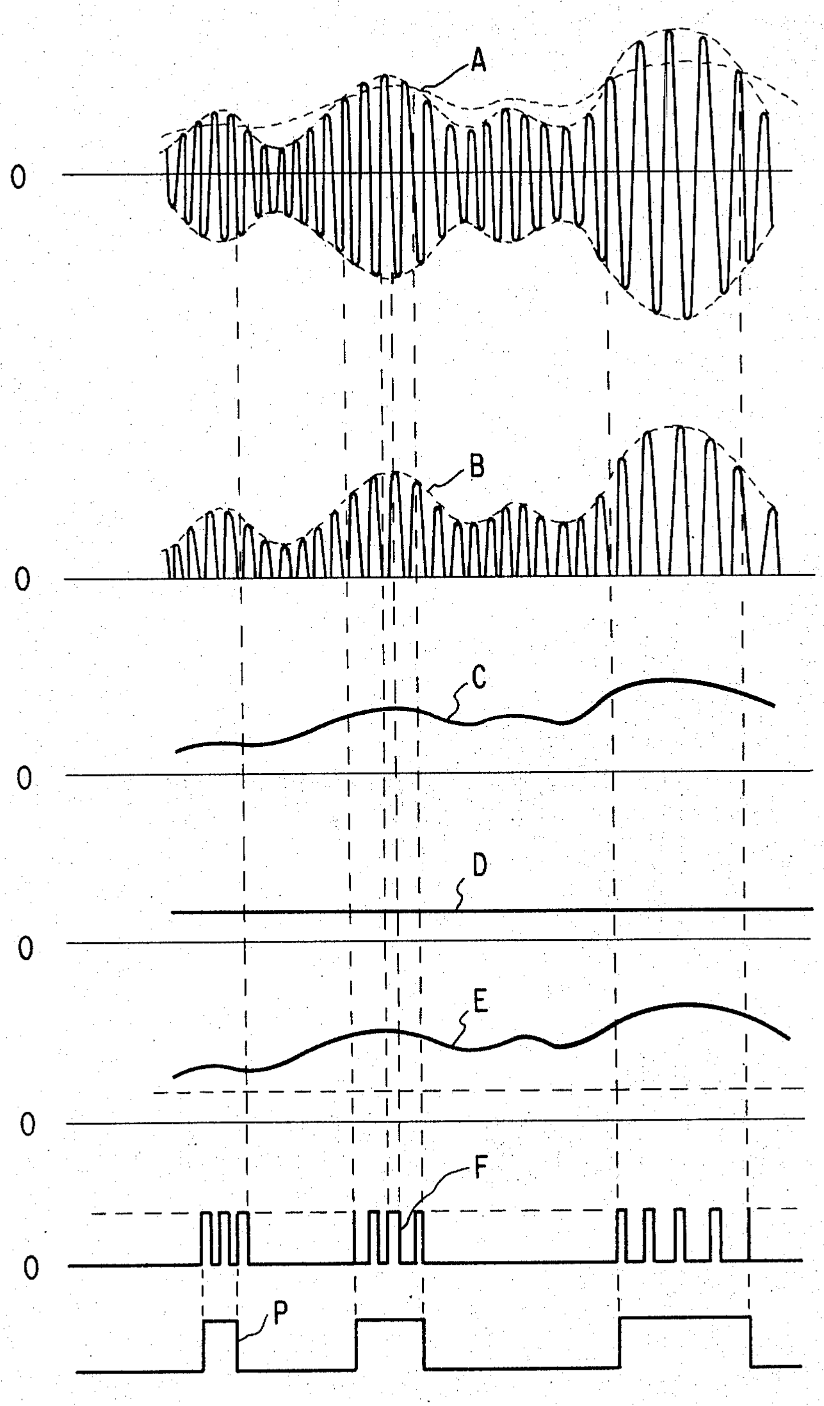
FIGS. 2(A) to 2(G) illustrate the signal waveforms at various points in the system of FIG. 1.

Input circuit 10 includes an input terminal 11 to which the raw input information is applied, a band pass filter 12 and an automatic gain control (AGC) amplifier 13. The input level at terminal 11 may vary over an 80 decibel range. The output of amplifier 13 is connected through an adjustable attenuator 14, the voltage waveform at the attenuator tap A being shown in FIG. 2(A). A half-wave rectifier is connected to tap A and provides an output, at B, for positive portions of the input. FIG. 2(B) illustrates the rectified half-wave voltage at B.

The threshold circuit 20 includes a timing circuit 21 preferably of the RC type connected to the output B of the input circuit 10. The time constant provided by circuit 21 is preferably variable and is, in any event, much greater than the inverse of the bandwidth of the input filter 12. The slowly varying output, C, of timing circuit 21, which is illustrated at FIG. 2(C), is connected to a summing device or summer 22 to which is also applied an adjustable, continuous or constant reference voltage D illustrated in FIG. 2(D) and provided by an adjustable D.C. voltage source 23. The output, E, of summer 22, which is shown in FIG. 2(E), is connected to input terminal 31 of comparator 30.

The other input terminal 32 of comparator 30 is, as mentioned above, directly connected to the output B of input circuit 10. Comparator 30 produces a binary output at F, this output being a logical "one" where the signal level at input terminal 32 equals or exceeds the threshold or reference level at input terminal 31 and a logical "zero" where the former signal is less than the latter (see FIG. 2(F)).

Shaping circuit 60, which is described in more detail below in connection with FIG. 5(A), converts the output envelope of comparator 30 into a corresponding rectangular pulse (see waveform P of FIG. 2(G)) which is processed by signal processing circuit 40.

Signal processing circuit 40 comprises a circulating memory 41 timing of which is controlled by clock 50, a summing device or summer 42 and decision circuit 43. Memory 41 contains a relatively large number of stages, e.g., at least several decades and possibly several hundreds, for circulating storage of the input information, under the control of clock 50. Summer 42 provides, at G, the arithmetical sum of the content of the N stages of circulating memory 41, this sum being provided in either analog or digital form. Decision circuit 43 provides an adjustable threshold which, if exceeded by the output at G, results in an output at Q indicating that there is a useful signal at input terminal 11.

As noted, the system of FIG. 1 provides a number of different adjustments. Specifically, the input level to rectifier 15 can be varied by varying the setting of the tap of attenuator 14, the time constant of timing circuit 21 can be varied by adjusting the value of the resistive shunt, the threshold voltage level of reference voltage source 23 can be varied, and the threshold level of decision circuit 43 can be varied. In addition, the number of effective stages of circulating memory 41 can be modified as desired as well as the frequency of the clock 50 used in advancing the information in memory 41. For example, where $h$ is the clock frequency, other frequencies such as $h/2$, $h/4$, etc., can be conveniently provided or even frequencies where h is divided by non-binary integer.

The input level at terminal 11 is essentially variable and varies almost linearly with the power of the noise. Hence, the voltage level at A is variable over a fairly wide range, e.g., 40 decibels. Thus, it is sufficient that AGC amplifier 13 provide restoration of variations in the input level of 80 to 40 decibels. It is noted that AGC amplifiers generally used in this connection are required to restore a range of variation of about 80db. to 20db. and hence the AGC amplifier used in the system of the invention can be simpler in construction and less expensive than those employed in conventional systems.

Figure 3:
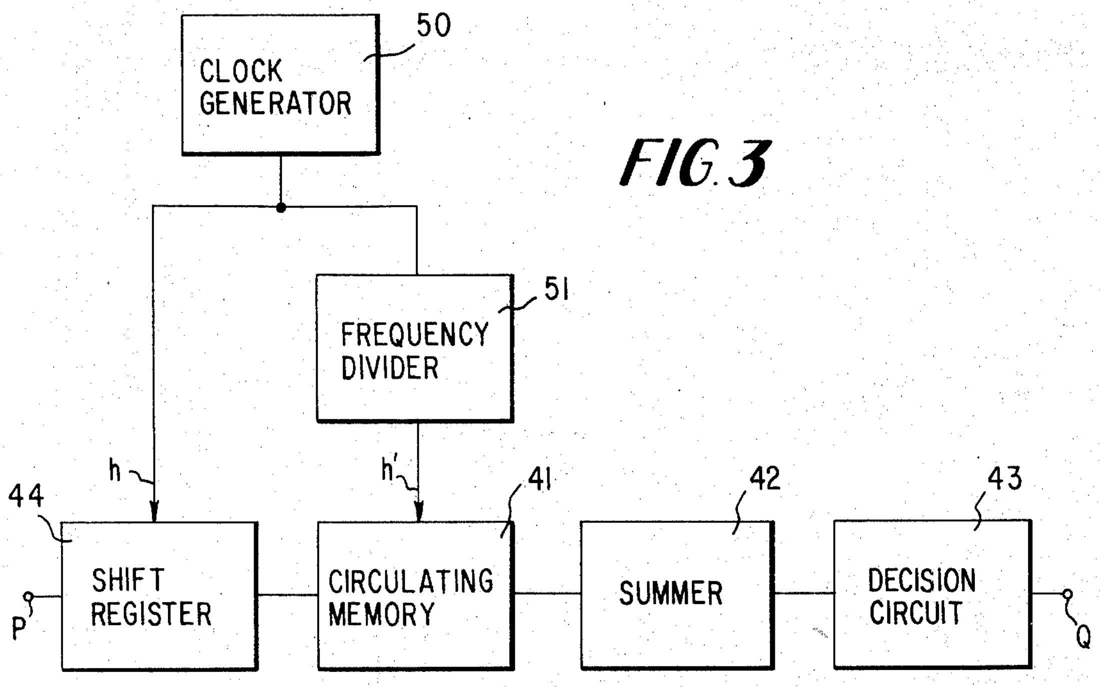
FIG. 3 is a schematic block diagram of a preprocessing circuit for processing the signals prior to entry into the circulating memory of FIG. 1.

Referring to FIG. 3, an alternate embodiment of signal processing circuit 40 is shown which enables retarding of the timing or frequency of advance of the information in a circulating memory 41. In FIG. 3, elements similar to those of FIG. 1 have been given the same numbers and hence elements 41, 42 and 43 of FIG. 3 correspond to elements 41, 42 and 43 shown in FIG. 1 and described above. The circuit of FIG. 3 additionally includes a majority filter system comprising a shift register 44 which is of conventional construction per se and serves to eliminate random fluctuations in the memory input. Shift register 44 is controlled by the clock frequency $h$ produced by clock 50, as indicated. Also as shown, a frequency divider 51 is connected to the output of clock 50 which divides the clock frequency h by an integer $k$ so that clocking of circulating memory 41 takes place at a frequency $h' = h/k$.

The signal processing system described hereinabove is most effective where the clock frequency $h$ is synchronized with the frequency of the signal to be detected. This frequency is not known with any degree of precision and may fluctuate within the pass band of input filter 12 of FIG. 1. However, in certain important applications of the invention, such as in systems where active sounding devices or sonar are employed, the received frequency may be influenced by the Doppler Effect produced by the relative movement between the target object (submarine hull) returning an echo and the sonar apparatus itself, i.e., by the so-called "mark radial." Moreover, it is current practice in sonar systems to use a transmitting frequency having a saw tooth variation, e.g., in modulated frequency sonar. Two schemes for recovering or extracting the clock frequency from the incident signal are shown in FIGS. 4 and 5(A).

Figure 4:
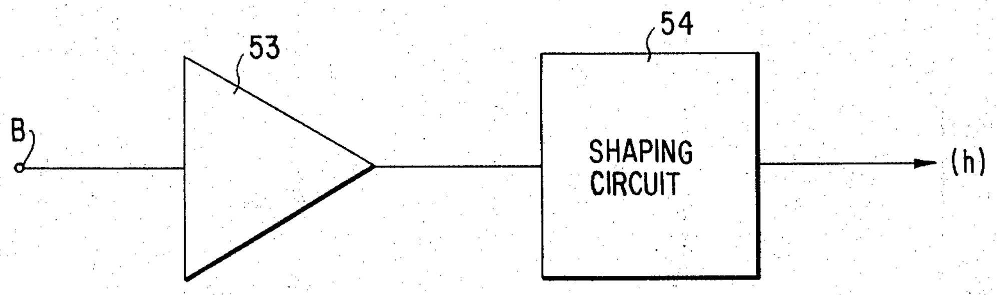
FIG. 4 is a schematic block diagram of a first circuit used in deriving the clock frequency utilized in the preprocessing circuit of FIG. 3.

Referring to FIG. 4, a high gain amplifier 53 is provided which is to be connected to point B of FIG. 1. A shaping circuit 54 is connected to the output of amplifier and produces clock pulses at the clock frequency $h$.

Figure 5A:
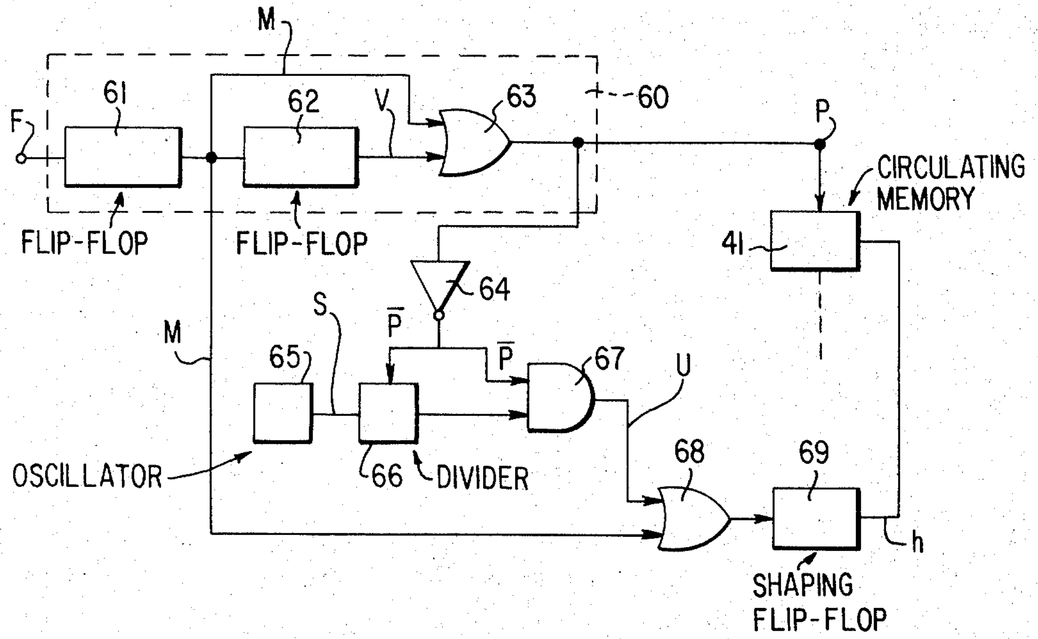
FIG. 5(A) is a schematic block diagram of a second circuit for generating a clock frequency.

Referring to FIG. 5(A), a circuit is shown which recovers the clock frequency from the binary output F of comparator 30 of FIG. 1. The circuit of FIG. 5(A) includes a shaping circuit 60 corresponding to that of FIG. 1 and comprising a first monostable multivibrator or flip-flop 61 which is connected to point F of FIG. 1 and produces an output signal M, a second flip-flop 62, which produces an output signal V, and an OR gate 63 connected to receive signals M and V. The signals F, M and V are shown in FIGS. 5(B), 5(C) and 5(D), respectively, while the output of OR gate 63, denoted P, is shown in FIG. 5(F).

Figures 5B, 5C, 5D, 5E, 5F, 5G, 5H, 5I:
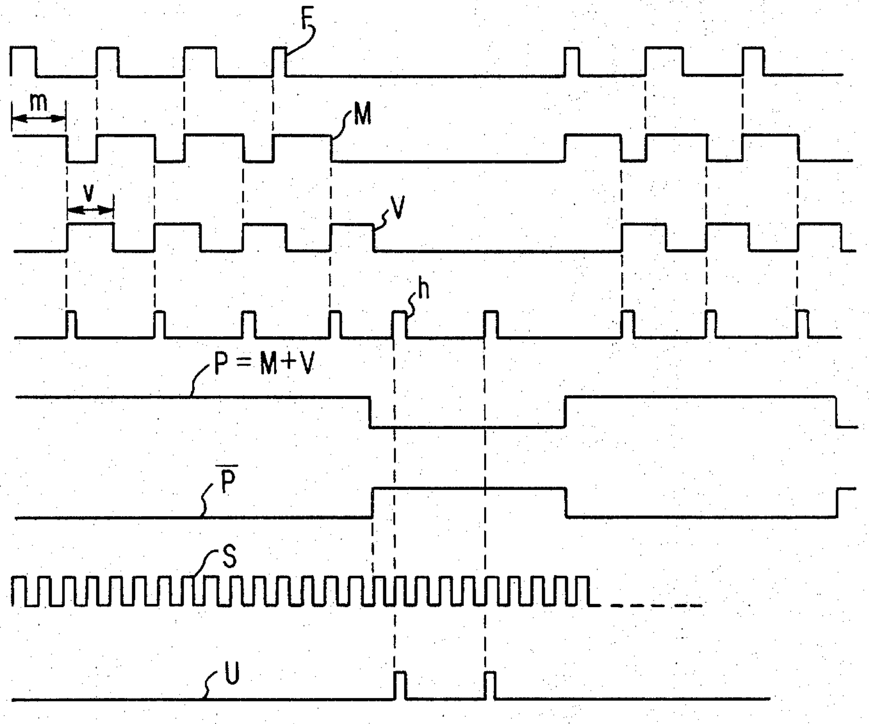
FIGS. 5(B) to 5(I) are waveform diagrams of the signals at various points in FIG. 5(A)

The output of OR gate 63, after being inverted by an inverter 64, forms one input, denoted $\bar{P}$ and shown in FIG. 5(G), of a divider network 66. An oscillator 65 produces an output S of frequency $f$ (see FIG. 5(H)) which forms the second input to divider 66, divider 66 serving to divide the oscillator frequency by four, although as will be seen hereinafter this value is not critical. The $\bar{P}$ output of inverter 64, which serves as a triggering control or command input to divider 66, is also connected to an input of an AND gate 67, the output of divider 66 providing the second input. A further OR gate 68 includes a first input connected to the output, U, of AND gate 67 (see FIG. 5(I)) and a second input connected to the output of flip-flop 61. The output of OR gate 67 is connected to a further flip-flop 69 which serves as a shaping circuit and produces a clock frequency output $h$ (see FIG. 5(E)). The output signal P of circuit 60 is applied to the information or data input of circulating memory 41 whereas the output of flip-flop 69 forms the clock input to memory 41.

The operation of the circuit of FIG. 5(A) can perhaps be best understood with reference to waveform diagrams 5(A) to 5(I) referred to above. Further, it is helpful to consider a specific practical example, i.e., application of the invention to systems employing modulated freqency sonar. Thus, it is assumed that the received frequency lies within a range of $f \pm B/2 =$ 2,800Hz ± 110Hz, where B is the band width of filter 12 of FIG. 1. The input signals F are spaced apart by a period which varies slightly about a value T of duration 1/2600s, i.e., about 385$\mu$s, for a frequency of 2,600 Hz for the signal at the input to comparator 30. As stated, these signals vary or fluctuate slightly in their spacing as well as in their individual durations.

As shown in FIG. 5(C), the leading edge of pulse F serves to trigger pulse M which are of uniform duration *m*. The trailing edges of pulses M trigger pulses V of uniform duration *v* (see FIG. 5(D)). Signal P of FIG. 5(F) is the logical sum of pulse trains M and V. The output U of divider 66, shown in FIG. 5(I), is produced by dividing the output S of oscillator 65 by four, divider 66 being operative during the time which $\bar{P}$ has a value "one." This arrangement ensures that a pulse U will be produced a short time after the appearance of pulse signal P. Flip-flop 69 produces clock advance pulses *h* continuously, notwithstanding the value of input signal F, the clock pulses being furnished by the leading edge of the pulses of pulse train M when P = 1 and by pulses U for P = 0.

The use of a signal f having a frequency four times that of the average signal to be processed permits the signal U to immediately follow the clock signal produced by pulse train M for the times where P = 0. When the threshold is not exceeded, it is essential that the external clock be centered on the average value of the incident signal. Flip-flop 61 must always be producing a zero output at the arrival of signal F and hence the "on" times thereof must be shorter than the interval between the leading edges of adjacent pulses (pulse envelopes) of signal F. To this end, i.e., to provide a continuous signal P responsive to pulse train F, two flip-flops 61 and 62 are provided with the leading edge of the former triggering the latter. The triggering durations or "on" times *m* and *v* are preferably governed in accordance with the following exemplary considerations. Let *f* be the reference frequency, with *f* = 2,600Hz. The variations of fluctuations in the received frequency cover the band *f* – B/2 to *f* + B/2 where B = 220Hz. Adding a further variation factor J having a value of about ± 50$\mu$c and noting that the limitation during the total "on" time, *m* + *v*, of the two flip-flops 61 and 62, one pulse F must be received which is separated from a preceding pulse by as long a separation time as possible, but two pulses cannot be received spaced or separated by the shortest possible time, these conditions can be expressed in the form:

$$1/f - B/2 + J \leq m + v \leq 2/f + B/2 - J.$$

With, as given above, *f* = 2,600 Hz = 1/T, B = 220 Hz and J = 50$\mu$s, the expression becomes: 450$\mu$s ≤ *m* + *v* ≤ 690$\mu$s. Preferably, *m* has a duration of 0.6 to 0.8T while v has a duration of 0.7 to 0.5T so that the total time *m* + *v* is approximately 1.3T.

It will be appreciated that in the absence of pulse train F(F = 0), signal U ensures that clock advance pulses will be continuously applied to circulating memory 41.

Figure 6:
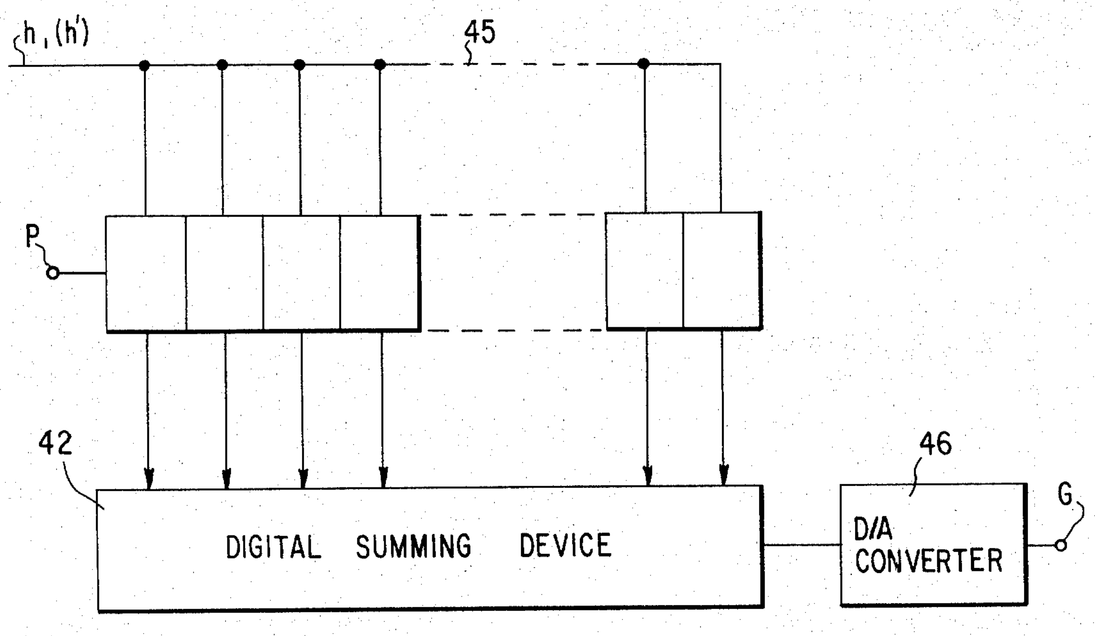
FIGS. 6 and 7 are schematic block diagrams of two embodiments of the circulating memory and associated summing circuit of FIG. 1.

Referring to FIG. 6, a particularly simple, inexpensive and effective embodiment of the circulating memory 41 of FIGS. 1 and 5(A) is shown. The circuit of FIG. 6 includes a shift register 44 corresponding to that of FIG. 3 and connected to receive input signal P. A clock advance input line receives clock pulses *h* or *h'* (see FIG. 3) is connected to the clock inputs of the individual stages of shift register 44 and the outputs are summed by a digital summing circuit 42 (corresponding to summer 42 of FIGS. 1 and 3). The output of summing circuit 42 is connected to a digital-to-analog (D/A) converter 46 which produces an output at G.

Figure 7:
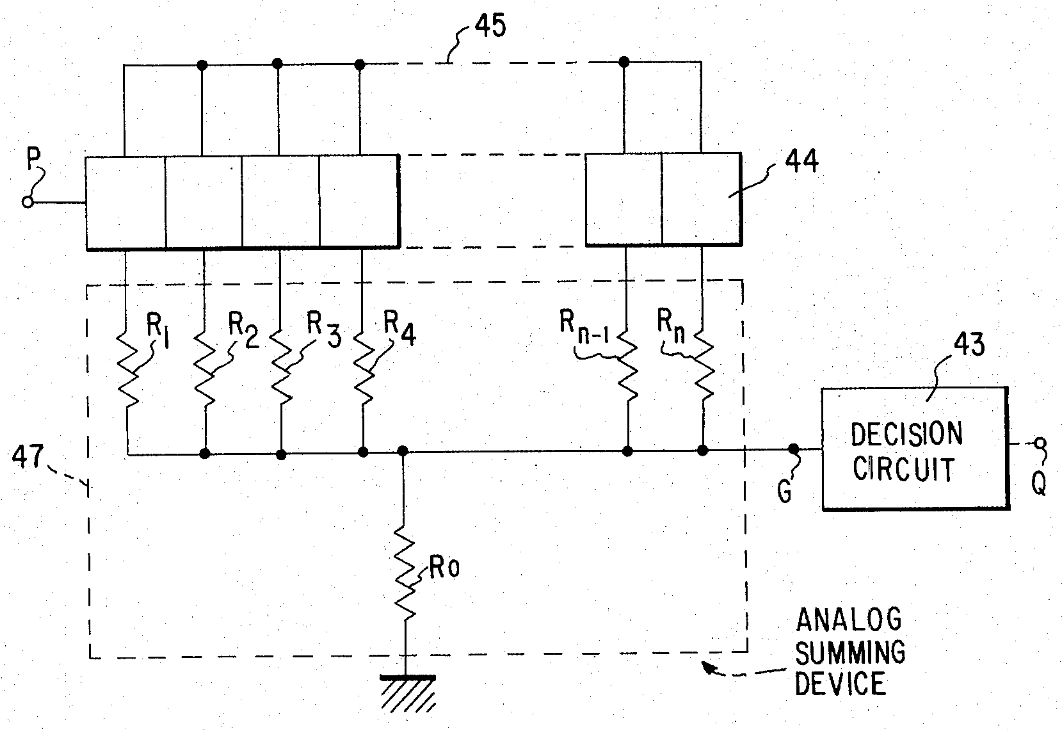

Referring to FIG. 7, the alternate embodiment of the circulating register of FIG. 6 is shown wherein units 42 and 46 are combined into a single unit in the form of an analog summing circuit 47. The analog summing circuit 47 comprises N equal resistances $R_1$, $R_2$, $R_3$, $R_4$ . . . $R_{n-1}$, $R_n$ each individually connected to the output of one stage of shift register 44 and connected together to ground through a resistor $R_o$ and to a common point G which is the input to decision circuit 43.

For the sonar application discussed, and a data carrier frequency having an average value *f* = 2,600Hz, or a period of T = 385$\mu$s, approximately, a shift register comprising 100 stages will store the received data during a period of about 38.5ms, a period close to one of the periods normally used in sonar transmission namely, 30ms. For longer transmission periods, a clock with a lower frequency (such as *h'* of FIG. 3) can be used to advantage, possibly in connection with a majority filtering device for data P at the input of shift register.

For sonar applications, each sonar channel is to be equipped with a system such as described. For other applications, such as observation applications, the number of stages of the shift register 44, or, more generally, the number of stages of circulating memory 41, can be higher, e.g., 500 or more.

Figure 8:
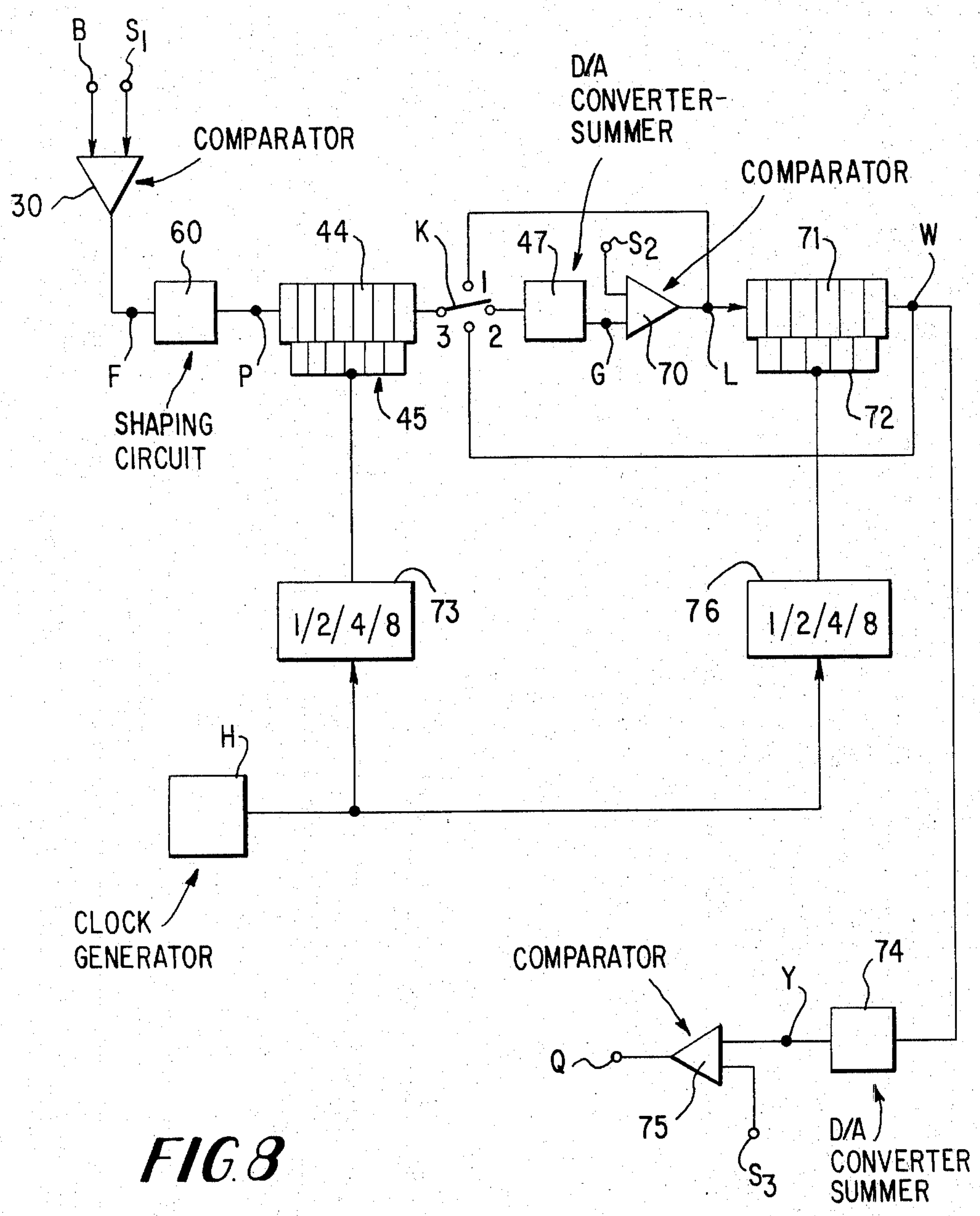
FIG. 8 is a schematic circuit diagram of a further embodiment of the invention.

Referring to FIG. 8, an alternate embodiment of a portion of the system of FIG. 1 is shown which includes an input terminal B corresponding to that of FIG. 1 as well as a corresponding comparator 30, (which compares the input at B with a first reference or threshold signal $S_1$), and shaping circuit 60. A shift register 44 is connected through a three position switch K which in position 2 connects an output of shift register 44 to digital to analog converter and summing circuit 47, corresponding to that of FIG. 7, and a further threshold comparison circuit or comparator 70 which compares the output of circuit 47 with a second threshold input S2. A further shift register 71, which produces an output W, is connected to the output of comparator 70 and with switch K in position 1 the output of register 44 is directly connected to the input of register 71. With switch K in position 3 the output of shift register 44 is connected to the output of register 71 thereby bypassing the circuitry just described. The output of second shift register 71 is connected to the input of a further D/A converter and summing circuit 74, corresponding to circuit 47, which is, in turn, connected to a decision circuit 75, which provides an output Q and preferably comprises a threshold comparator with a third threshold or reference voltage $S_3$ as the other input.

A clock recovery circuit H provides the clock advance inputs to shift registers 44 and 71 and is connected thereto through respective frequency dividers 73 and 75, which divide, for example, by 1, 2, 4 or 8. Registers 44 and 71 can have the same number of stages, or a different number, and the clock control frequency produced by circuit H can be divided as desired by dividers 73 and 76, the latter being independently adjustable as desired by the operator. Other division factors can, of course, also be used if desired.

With switch K in position 1, registers 44 and 71 are connected in series and form the equivalent of a single register of greater length. With switch K in position 3, register 71 is bypassed and the circuit is equivalent to that of FIG. 7. For position 2 of switch K the output signals from register 44 are processed by units 71, 74 and 75 in a manner similar to that of the analog signals at B provided by units 30, 60, 44, 47 and 70. The advantages of this arrangement will be discussed hereinbelow with reference to FIGS. 9(A) to 9(F) which represent the voltage waveforms as a function of time at points B, P, G, L, Y and Q in FIG. 8.

Figures 9A, 9B, 9C, 9D, 9E, 9F, 9G:
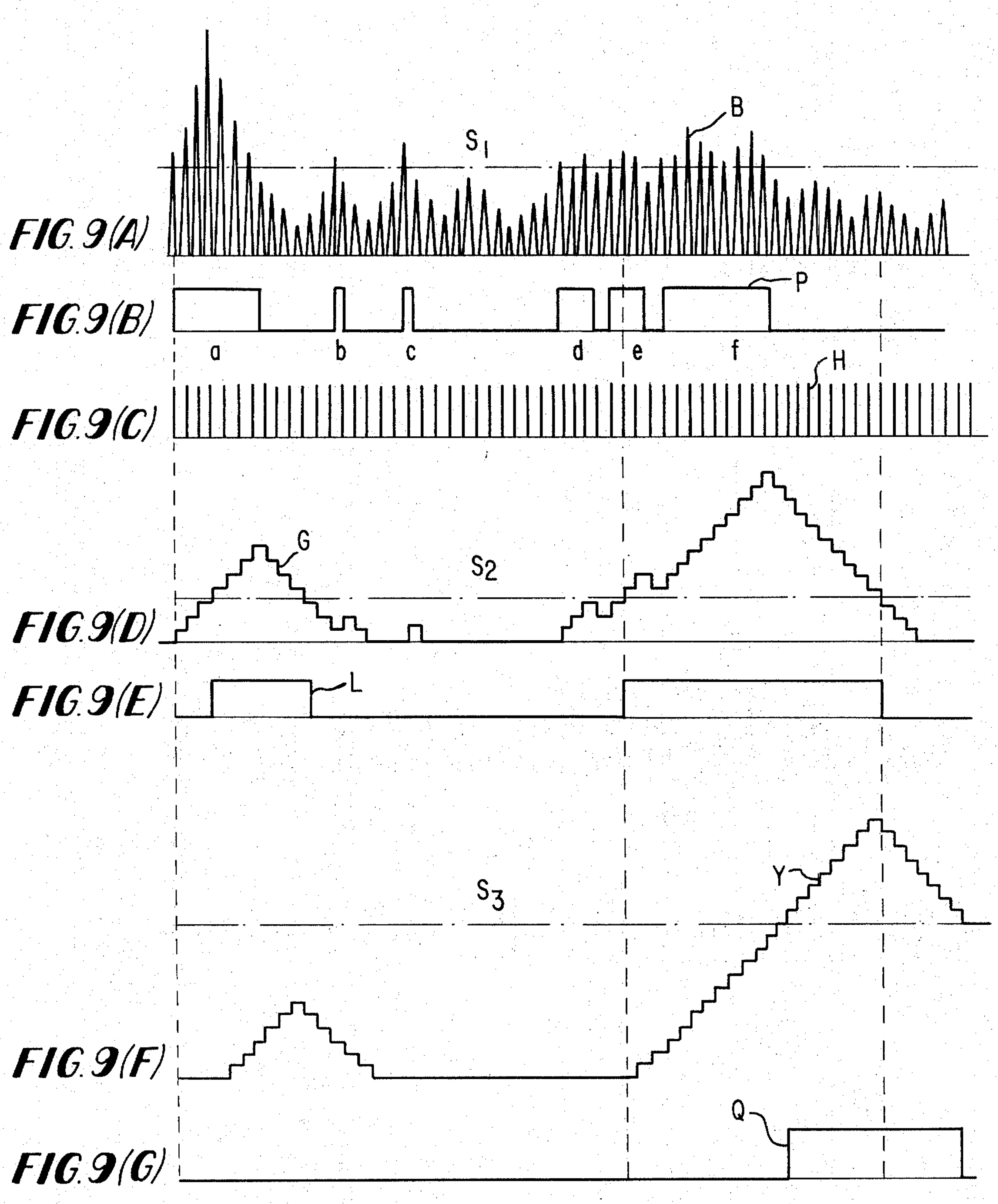
FIGS. 9(A) to 9(G) are waveform diagrams of the signals at various points in FIG. 8.

Again considering a practical application of the invention, viz., where the signal at B is derived from a sonar based, active sounding system, the carrier frequency of the signal to be processed, after processing in the receiver, is, for example, $f = 2{,}600$Hz. Modern sonar systems are generally frequency modulated, the frequency excursion covering a band B of, for example, 220Hz, as mentioned above. The output of filter 12 of FIG. 1 is a signal whose peak periodically varies in frequency of a value 1/220Hz, which is approximately 4.5 milliseconds. Assuming during the first portion of the time interval under consideration, an intense parasitic signal is present which exceeds the threshold value $S_1$ of comparator 30 of FIG. 8, the first time during a certain interval of FIG. 9(B) and twice more during the brief intervals b and c. Further, assume that during a second part of this interval the threshold $S_1$ is exceeded for a relatively long period which is twice briefly interrupted, as represented by periods *d*, *e* and *f* of FIG. 9(B). In this situation the first threshold exceeding signals, *a*, *b* and *c*, are intended to represent false signals due to intense parasites whereas the further signals, *d*, *e* and *f*, are intended to represent an echo from a submarine target, i.e., a useful signal. FIG. 9(A) shows the raw signals at B relative to threshold $S_1$ and FIG. 9(B) shows the corresponding pulses produced by shaping circuit 60. The pulses making up signal P are converted in shift register 44 and D/A converter-summing circuit 47 to a staircase analog signal G shown in FIG. 9(B) which is increased by one increment with each clock pulse (FIG. 9(C)) during the "on" time (binary "one" state) of signal P and are diminished or decremented one increment for each clock pulse during the "off" times (binary "zero" state) of signal P. The variable analog signal G is compared in comparator 70 with a reference level $S_2$ as indicated in FIG. 9(D) to produce a pulse output shown at FIG. 9(E). Similarly, the output signal L is processed by shift register 71 and D/A converter-summing circuit 74 to produce an analog signal Y shown in FIG. 9(F), similar to that of FIG. 9(D). After comparison with a third reference level $S_3$ in comparator 75, an output pulse Q is produced corresponding to the useful signal. Thus, as stated, the system of FIG. 8 provides suppression of brief, although intense, parasitic signals. The system of FIG. 8 enables the operator, through the setting of switch K, to vary the rate of sampling provided by units 70 and 71 as well as the threshold levels $S_1$, $S_2$ or $S_3$, desired, in accordance with local operating conditions.

It will be appreciated from the foregoing that the system of the invention as applied to detecting an echo returned from a submarine target provides instantaneous evaluation of the power contained in the first signal using the first shift register and evaluation of the total power in the echo using the second shift register and associated circuitry. This permits suppression of a brief parasitic pulse, even where intense, while providing detection of an echo even where the latter is markedly distorted by noise.

Although the invention has been described relative to exemplary embodiments thereof, it will be understood by those skilled in the art that variations and modifications can be effected in these embodiments without departing from the scope and spirit of the invention.

I claim:

1. A system for detecting a weak useful signal in a noisy received signal, said system comprising a relatively narrow band, band pass filter connected to receive the signal to be processed, an automatic gain control amplifier connected to the output of said filter and providing a gain which is automatically variable in accordance with the output of said filter, a comparator circuit connected to the output of said amplifier for producing an output when said amplifier output exceeds a threshold level, means for converting the output of said comparator circuit into a pulse train of corresponding continuous rectangular pulses, means for sampling said rectangular pulses at a fixed clock frequency which is substantially shorter than the minimum duration of a useful signal, circulating memory means for receiving the samples, summing means for arithmetically summing the pulses stored in said circulating memory at each clock time, and a decision circuit for comparing the arithmetical sum of said pulses with a second threshold level.

2. A system as claimed in claim 1 wherein said first threshold level is produced by a further comparator circuit including first input connected to receive a voltage which is a function of the average power of the received signal to be processed and a second input connected to an adjustable D.C. voltage source.

3. A system as claimed in claim 1 wherein said sampling means comprises first and second series-connected monostable multivibrators and an OR gate connected to the output of each of said multivibrators, the triggering time of said first multivibrator being between about 0.6 to 0.8T and the triggering time of the second multivibrator being between about 0.7 to 0.5T, where T is the inverse of the average frequency of the received signal, the total duration of the two multivibrators being greater than the longest period of the received signal.

4. A system as claimed in claim 3 wherein said sampling means is controlled by a clock frequency generator means which produces a clock frequency equal to the frequency of received signal, said clock frequency generator means comprising at least one amplifier and a pulse shaping circuit.

5. A system as claimed in claim 3 wherein said sampling means is controlled by a clock frequency generating circuit comprising a further OR gate having a first input connected to the output of said first multivibrator and a second input connected to the output of an AND gate, said system further comprising an oscillator producing an output *kf*, where *k* is a whole number, and a frequency divider for dividing the output of said oscillator by *k*, the said AND gate including a first input connected to the output of said frequency divider and second input connected to the inverted output of the first mentioned OR gate, said inverted output controlling actuation of said divider and a monostable shaping circuit being connected to the output of said further OR gate.

6. A system as claimed in claim 1 wherein said circulating memory means is controlled by a clock frequency generator which produces a clock advance frequency which is a sub-multiple of said clock frequency.

7. A system as claimed in claim 6 further comprising a majority filtering circuit connected in front of said circulating memory means.

8. A system as claimed in claim 1 wherein said summing means comprises digital summing means including a digital to analog converter.

9. A system as claimed in claim 1 wherein said summing means comprises analog summing means.

10. A system as claimed in claim 1 wherein said circulating memory means comprises a shift register.

11. A system as claimed in claim 10 wherein said summing means comprises a resistor ladder network with one resistor individually connected to each stage of said shift register and all resistors connected to a common point.

12. A system as claimed in claim 1 wherein said system comprises a first shift register, a first summing circuit, a threshold circuit, a second shift register, a second summing circuit and a decision circuit connected in series.

13. A system as claimed in claim 12 further comprising a frequency divider circuit connected between a clock frequency generator for generating said clock frequency and the clock advance input of said first shift register and a second, independently variable frequency divider circuit connected between said clock frequency generator and the clock advance input of said second shift register.

14. A receiver for an active sounding device including a system as claimed in claim 11.

15. A receiver for an active sounding device including a signal processing system as claimed in claim 13.

* * * * *